United States Patent [19]
Dall'Occo et al.

[11] Patent Number: 5,849,653
[45] Date of Patent: Dec. 15, 1998

[54] CATALYSTS AND PROCESSES FOR THE POLYMERIZATION OF OLEFINS

[75] Inventors: Tiziano Dall'Occo, Farrara; Maurizio Galimberti, Milano; Luigi Resconi, Ferrara; Enrico Albizzati, Arona; Gianni Pennini, Porotto, all of Italy

[73] Assignee: Montell Technology Company bv, Hoffddorp, Netherlands

[21] Appl. No.: 503,948

[22] Filed: Jul. 19, 1995

[30]  Foreign Application Priority Data

Jul. 20, 1994 [IT] Italy ................................. MI94A1516

[51] Int. Cl.⁶ ....................................... C08F 4/64
[52] U.S. Cl. .......................... 502/117; 502/152; 502/155; 502/111; 526/127; 526/160; 526/943
[58] Field of Search ..................... 502/117, 152, 502/155; 526/160, 943

[56]  References Cited

FOREIGN PATENT DOCUMENTS

| | | |
|---|---|---|
| 0 069 951 A1 | 1/1983 | European Pat. Off. . |
| 0 170 059 A1 | 2/1986 | European Pat. Off. . |
| 0 384 171 A1 | 8/1990 | European Pat. Off. . |
| 0 407 870 A2 | 1/1991 | European Pat. Off. . |
| 0 501 370 A1 | 9/1992 | European Pat. Off. . |
| 0 562 258 A2 | 9/1993 | European Pat. Off. . |
| 0 575 875 A2 | 12/1993 | European Pat. Off. . |
| 575875 | 12/1993 | European Pat. Off. . |
| 0 633 272 A1 | 1/1995 | European Pat. Off. . |
| 26 08 863 | 9/1977 | Germany . |
| 26 08 933 | 9/1977 | Germany . |

OTHER PUBLICATIONS

Von Karl Ziegler et al. "Aluminiumtrialkyle und Dialkyl-Aluminiumhrdirde aus Aluminiumisobutyl-Verbindungen", Lieifs Ann. Chem., vol. 629, pp. 14–19, May 1959.

Ronald L. Halterman, "Synthesis and Applications of Chiral Cyclopentadienylmetal Complexes", Chem. Rev. 1992, 92, pp. 965–994.

Patent Abstracts of Japan, unexamined applications, C Field, vol. 9, No. 287, p. 28C 314, Nov. 14, 1985.

Patent Abstracts of Japan, unexamined applications, C Field, vol. 10, No. 136, p. 90 C 347, May 20, 1986.

L. Resconi et al. "Olefin Polymerization at Bis(pentamethylcyclopentadienyl)zirconiumand –hafnium Centers: Chain– Transfer Mechanisms", J. Am. Chem. Soc. 1992, 114, pp. 1025–1032.

Von Karl Ziegler et al. "Aluminiumtrialkyle und Dialkyl-Aluminiumhydride aus Aluminiumisobutyl-Verbindungen", Liebigs Ann. Chem., vol. 629, pp. 14–19.

*Primary Examiner*—David W. Wu
*Attorney, Agent, or Firm*—Bryan Cave LLP

[57]  ABSTRACT

Catalysts for the polymerization of olefins are disclosed, which comprise the reaction product of:

(A) a bridged and/or substituted cyclopentadienyl compound of titanium, zirconium or hafnium;

(B) an organometallic aluminum compound of the formula (II):

$$Al(CH_2-CR^4R^5R^6)_w R^7_y H_z \qquad (II)$$

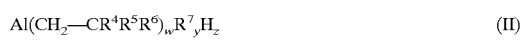

wherein in the $(CH_2-CR^4R^5R^6)$ groups, which are the same or different, $R^4$ is an alkyl, alkenyl or arylalkyl group having from 1 to 10 carbon atoms, $R^5$ is an alkyl, alkenyl, aryl, arylalkyl or alkylaryl group having from 3 to 50 carbon atoms which is different from a straight alkyl or alkenyl group and, optionally, $R^4$ and $R^5$ fused together can form a ring having from 4 to 6 carbon atoms, $R^6$ is hydrogen or an alkyl, alkenyl or arylalkyl group having from 1 to 10 carbon atoms, the $R^7$ substituents, same or different, are alkyl, alkenyl, aryl, arylalkyl or alkylaryl radicals containing from 1 to 10 carbon atoms and, optionally, can contain Si or Ge atoms, w is 1, 2 or 3, z is 0 or 1, y=3−w−z; and (C) water. The molar ratio aluminum/water is comprised between 1:1 and 100:1. These catalysts show an improved activity with respect to known catalysts wherein an aluminum compound different from those of the above formula is used.

19 Claims, No Drawings

CATALYSTS AND PROCESSES FOR THE POLYMERIZATION OF OLEFINS

BACKGROUND OF THE INVENTION

1. Field of the Invention

The present invention relates to catalysts for the polymerization of olefins. In particular, it relates to high activity catalysts for the polymerization of olefins obtained from cyclopentadienyl compounds of a transition metal, organometallic aluminum compounds and water.

The invention also relates to processes for the polymerization of olefins carried out in the presence of the catalysts of the invention.

2. Description of the Prior Art

Homogeneous catalytic systems based on metallocene compounds, aluminum alkyl compounds and water are known to be active in the polymerization of olefins.

In European Patent Application EP 384,171, catalysts for the polymerization of olefins are described which comprise the reaction product of:

(a) a metallocene compound of the formula:

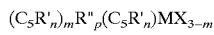
$(C_5R'_n)_m R''_p (C_5R'_n) MX_{3-m}$ wherein $(C_5R'_n)$ is an optionally substituted cyclopentadienyl group and two or four R' substituents of one and the same cyclopentadienyl group can form one or two rings having 4 to 6 carbon atoms, R" is a divalent radical bridging the two cyclopentadienyl groups, X can be for instance an halogen atom, M is a transition metal selected from Ti, Zr and Hf, p is 0 or 1, m is 0, 1 or 2, when m=0 then p=0 and when p=0 at least one R' substituent is different from hydrogen, n=4 when p=1 and n=5 when p=0; and (b) an alumoxane of the formula:

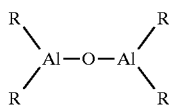

wherein the substituents R can generically be alkyl, alkenyl or alkylaryl radicals having 2–20 carbon atoms. The alumoxanes (b) are prepared by reacting the corresponding trialkylaluminum compounds with water in a molar ratio of 2:1. In the embodiment examples, alumoxanes are used in which the R substituents are ethyl, isobutyl or 2-methylpentyl groups.

European Patent Application EP 575,875 describes homogeneous catalytic systems for the polymerization of olefins comprising:

(A) a cyclopentadienyl compound of the formula:

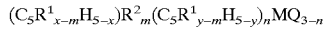
$(C_5R^1_{x-m}H_{5-x})R^2_m(C_5R^1_{y-m}H_{5-y})_n MQ_{3-n}$ in which M is Ti, Zr or Hf, $C_5R^1_{x-m}H_{5-x}$ and $C_5R^1_{y-m}H_{5-y}$ are equally or differently substituted cyclopentadienyl rings and two or four substituents $R^1$ of the same cyclopentadienyl dienyl group can form one or two rings having from 4 to 6 carbon atoms, $R^2$ is a bridging group which links the two cyclopentadienyl rings, the substituents Q are preferably chlorine atoms, m can be 0 or 1, n can be 0 or 1, being 1 when m=1, x is an integer comprised between m+1 and 5, y is an integer comprised between m and 5;

(B) an organometallic aluminum compound of the formula:

$AlR^4_{3-z}H_z$ wherein the substituents $R^4$ are alkyl, alkenyl or alkylaryl radicals containing from 1 to 10 carbon atoms, which may also contain Si or Ge atoms, at least one of the substituents $R^4$ being different from a straight alkyl group, z being 0 or 1; and (C) water.

The molar ratio between the organometallic aluminum compound and the water is comprised between 1:1 and 100:1. In the embodiment examples, only triisobutylaluminum and triisohexylaluminum are used as the organometallic aluminum compounds.

However, the catalysts described in the above cited patent applications have activities in the polymerization of olefins which are not completely satisfactory.

Therefore, the problem which the present invention sets out to solve is to improve the activities of the above discussed known catalysts.

SUMMARY OF THE INVENTION

To solve this problem, novel catalysts have unexpectedly been found which are suitable for the polymerization of olefins and possess a considerably improved activity compared with the known catalysts.

Thus, according to a first object, the present invention provides a catalyst for the polymerization of olefins comprising the product obtained by contacting the following components:

(A) a cyclopentadienyl compound of the formula (I):

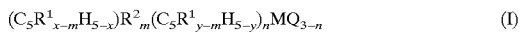
$(C_5R^1_{x-m}H_{5-x})R^2_m(C_5R^1_{y-m}H_{5-y})_n MQ_{3-n}$ (I)

in which M is Ti, Zr or Hf, $C_5R^1_{x-m}H_{5-x}$ and $C_5R^1_{y-m}H_{5-y}$ are cyclopentadienyl rings substituted in the same way or different ways, the substituents $R^1$ which can be identical or different are alkyl, alkenyl, aryl, alkylaryl or arylalkyl radicals which have 1 to 20 carbon atoms and can also contain atoms of Si or Ge, or groups $Si(CH_3)_3$, or two or four substituents $R^1$ of one and the same cyclopentadienyl group can also form one or two rings having 4 to 6 carbon atoms, $R^2$ is a group which as a bridge links the two cyclopentadienyl rings and is selected from $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, with the substituents $R^3$ which can be identical or different being $R^1$ or hydrogen or two or four substituents $R^3$ can also form one or two rings having 3 to 6 carbon atoms, the substituents Q which can be identical or different are halogen, hydrogen, $R^1$, $OR^1$, $SR^1$, $NR^1_2$ or $PR^1_2$, m can be 0 or 1, n can be 0 or 1, being 1, if m=1, x is an integer of between (m+1) and 5, and y is an integer of between m and 5, (B) an organometallic aluminum compound of the formula (II):

$Al(CH_2\text{—}CR^4R^5R^6)_w R^7_y H_z$ (II)

wherein in the $(CH_2\text{—}CR^4R^5R^6)$ groups, which are the same or different, $R^4$ is an alkyl, alkenyl or arylalkyl group having from 1 to 10 carbon atoms, $R^5$ is an alkyl, alkenyl, aryl, arylalkyl or alkylaryl group having from 3 to 50 carbon atoms which is different from a straight alkyl or alkenyl group and, optionally, $R^4$ and $R^5$ fused together can form a ring having from 4 to 6 carbon atoms, $R^6$ is hydrogen or an alkyl, alkenyl or arylalkyl group having from 1 to 10 carbon atoms, the $R^7$ substituents, same or different, are alkyl, alkenyl, aryl, arylalkyl or alkylaryl radicals containing from 1 to 10 carbon atoms and, optionally, can contain Si or Ge atoms, w is 1, 2 or 3, z is 0 or 1, y=3−w−z; and (C) water;

the molar ratio between the organometallic aluminum compound and the water being comprised between 1:1 and 100:1.

According to another object, the present invention provides a catalyst for the polymerization of olefins comprising the product obtained by contacting the following components:

(A) a cyclopentadienyl compound of the formula (I):

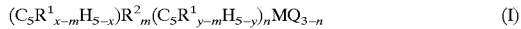

$(C_5R^1_{x−m}H_{5−x})R^2_m(C_5R^1_{y−m}H_{5−y})_nMQ_{3−n}$     (I)

in which M is Ti, Zr or Hf, $C_5R^1_{x−m}H_{5−x}$ and $C_5R^1_{y−m}H_{5−y}$ are cyclopentadienyl rings substituted in the same way or different ways, the substituents $R^1$ which can be identical or different are alkyl, alkenyl, aryl, alkylaryl or arylalkyl radicals which have 1 to 20 carbon atoms and can also contain atoms of Si or Ge, or groups $Si(CH_3)_3$, or two or four substituents $R^1$ of one and the same cyclopentadienyl group can also form one or two rings having 4 to 6 carbon atoms, $R^2$ is a group which as a bridge links the two cyclopentadienyl rings and is selected from $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, with the substituents $R^3$ which can be identical or different being $R^1$ or hydrogen or two or four substituents $R^3$ can also form one or two rings having 3 to 6 carbon atoms, the substituents Q which can be identical or different are halogen, hydrogen, $R^1$, $OR^1$, $SR^1$, $NR^1_2$ or $PR^1_2$, m can be 0 or 1, n can be 0 or 1, being 1, if m=1, x is an integer of between (m+1) and 5, and y is an integer of between m and 5; and (B') the product of the reaction between water and an organometallic aluminum compound of the formula (II):

$Al(CH_2—CR^4R^5R^6)_wR^7_yH_z$     (II)

wherein in the $(CH_2—CR^4R^5R^6)$ groups, which are the same or different, $R^4$ is an alkyl, alkenyl or arylalkyl group having from 1 to 10 carbon atoms, $R^5$ is an alkyl, alkenyl, aryl, arylalkyl or alkylaryl group having from 3 to 50 carbon atoms which is different from a straight alkyl or alkenyl group and, optionally, $R^4$ and $R^5$ fused together can form a ring having from 4 to 6 carbon atoms, $R^6$ is hydrogen or an alkyl, alkenyl or arylalkyl group having from 1 to 10 carbon atoms, the $R^7$ substituents, same or different, are alkyl, alkenyl, aryl, arylalkyl or alkylaryl radicals containing from 1 to 10 carbon atoms and, optionally, can contain Si or Ge atoms, w is 1, 2 or 3, z is 0 or 1, y=3−w−z, the molar ratio between the organometallic aluminum compound and the water being comprised between 1:1 and 100:1.

According to a further object, the invention provides a process for the polymerization of an olefin in the presence of a catalyst as described above.

DESCRIPTION OF THE PREFERRED EMBODIMENTS

The molar ratio between the organometallic aluminum compound and the water is comprised between 1:1 and 100:1, preferably between 1:1 and 50:1. A suitable value for the $Al/H_2O$ molar ratio is 2.

The molar ratio between the aluminum and the metal of the cyclopentadienyl compound is generally comprised between 50 and 10000, preferably between 500 and 5000.

Preferred cyclopentadienyl compounds of formula (I) are those in which the metal M is zirconium.

In the case of m=0, those cyclopentadienyl compounds are particularly suitable in which the $C_5R^1_{x−m}H_{5−x}$ and $C_5R^1_{y−m}H_{5−y}$ groups are pentamethylcyclopentadienyl, indenyl or 4,5,6,7-tetrahydroindenyl groups, while the Q substituents are chlorine atoms or hydrocarbon groups having 1 to 7 carbon atoms, preferably methyl groups.

Non-limiting examples of cyclopentadienyl compounds of formula (I) wherein m=0 are:

| | | |
|---|---|---|
| $(Me_3Cp)_2MCl_2$ | $(Me_4Cp)_2Cl_2$ | $(Me_5Cp)_2Cl_2$ |
| $(Me_5Cp)_2MMe_2$ | $(Me_5Cp)_2(OMe)_2$ | $(Me_5Cp)_2M(C_6H_5)_2$ |
| $(Me_5Cp)_2(CH_3)Cl$ | $(EtMe_4Cp)_2MCl_2$ | $[(C_6H_5)Me_4Cp]_2MCl_2$ |
| $(Et_5Cp)_2MCl_2$ | $(Me_5Cp)_2M(C_6H_5)Cl$ | $(Ind)_2MCl_2$ |
| $(Ind)_2MMe_2$ | $(H_4Ind)_2MCl_2$ | $(H_4Ind)_2MMe_2$ |
| $[(Si(CH_3)_3Cp]_2MCl_2$ | $\{[Si(CH_3)_3]_2Cp\}_2MCl_2$ | $(Me_4Cp)(Me_5Cp)MCl_2$ |
| $(Me_5Cp)MCl_3$ | $(Me_5Cp)MBenz_3$ | $(Ind)MBenz_3$ |
| $(H_4Ind)MBenz_3$ | | | wherein Me=methyl, Et=ethyl, Cp=cyclopentadienyl, Ind=indenyl, $H_4Ind$=4,5,6,7-tetrahydroindenyl, Benz=benzyl, and M is Ti, Zr or Hf and preferably is Zr.

In the case of m=1, those cyclopentadienyl compounds are particularly suitable in which the $C_5R^1_{x−m}H_{5−x}$ and $C_5R^1_{y−m}H_{5−y}$ groups are tetramethyl-cyclopentadienyl, indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl or fluorenyl groups, $R^2$ is a $(CH_3)_2Si$ or $C_2H_4$ group, while the Q substituents are chlorine atoms or hydrocarbon groups having 1 to 7 carbon atoms, preferably methyl groups.

Non-limiting examples of cyclopentadienyl compounds of formula (I) wherein m=1 are:

| | | |
|---|---|---|
| $Me_2Si(Me_4Cp)_2MCl_2$ | $Me_2Si(Me_4Cp)_2MMe_2$ | $Me_2C(Me_4Cp)(MeCp)MCl_2$ |
| $Me_2Si(Ind)_2MCl_2$ | $Me_2Si(Ind)_2MMe_2$ | $Me_2Si(Me_4Cp)_2MCl(OEt)$ |
| $C_2H_4(Ind)_2MCl_2$ | $C_2H_4(Ind)_2MMe_2$ | $C_2H_4(Ind)_2M(NMe_2)_2$ |
| $C_2H_4(H_4Ind)_2MCl_2$ | $C_2H_4(H_4Ind)_2MMe_2$ | $C_2H_4(H_4Ind)_2M(NMe_2)OMe$ |
| $Ph(Me)Si(Ind)_2MCl_2$ | $Ph_2Si(Ind)_2MCl_2$ | $Me_2C(Flu)(Cp)MCl_2$ |
| $C_2H_4(Me_4Cp)_2MCl_2$ | $C_2Me_4(Ind)_2MCl_2$ | $Me_2SiCH_2(Ind)_2MCl_2$ |
| $C_2H_4(2-MeInd)_2MCl_2$ | $C_2H_4(3-MeInd)_2MCl_2$ | $C_2H_4(4,7-Me_2Ind)_2MCl_2$ |
| $C_2H_4(5,6-Me_2Ind)_2MCl_2$ | $C_2H_4(2-MeH_4Ind)_2MCl_2$ | $C_2H_4(2,4,7-Me_3H_4Ind)_2MCl_2$ |
| $C_2H_4(4,7-Me_2H_4Ind)_2MCl_2$ | $C_2H_4(2,4,7-Me_3Ind)_2MCl_2$ | |
| $C_2H_4(2-Me-Benz[e]Ind)_2MCl_2$ | $C_2H_4(Benz[e]Ind)_2MCl_2$ | |
| $Me_2Si(2-MeInd)_2MCl_2$ | $Me_2Si(4,7-Me_2Ind)_2MCl_2$ | |
| $Me_2Si(5,6-Me_2Ind)_2MCl_2$ | $Me_2Si(2,4,7-Me_3Ind)_2MCl_2$ | |

-continued

Me$_2$Si(2-Me$_{H4}$Ind)$_2$MCl$_2$      Me$_2$Si(4,7-Me$_2$H$_4$Ind)$_2$MCl$_2$
Me$_2$Si(2,4,7-Me$_3$H$_4$Ind)$_2$MCl$_2$  Me$_2$Si(Benz[e]Ind)$_2$MCl$_2$
Me$_2$Si(2-Me-Benz[e]Ind)$_2$MCl$_2$ wherein Me=methyl, Cp=cyclopentadienyl, Ind=indenyl, Flu=fluorenyl, Ph=phenyl, H$_4$Ind=4,5,6,7-tetrahydroindenyl, M is Ti, Zr or Hf and preferably is Zr.

In the organometallic aluminum compounds of the formula (II) $R^4$ is preferably a methyl or ethyl group, $R^5$ is preferably a branched-chain alkyl, alkenyl or alkylaryl group having from 3 to 30 carbon atoms, more preferably from 4 to 10 carbon atoms, or it is an optionally substituted phenyl group, $R^6$ is preferably hydrogen, $R^7$ is preferably an alkyl group containing from 1 to 5 carbon atoms such as an isobutyl group.

Non-limiting examples of organometallic aluminum compounds of formula (II) according to the invention are:
tris(2,4,4-trimethylpentyl)aluminum,
bis(2,4,4-trimethylpentyl)aluminum hydride,
isobutyl-bis(2-phenyl-propyl)aluminum,
diisobutyl-(2-phenyl-propyl)aluminum,
isobutyl-bis(2,4,4-trimethylpentyl)aluminum,
diisobutyl-(2,4,4-trimethylpentyl)aluminum.

A particular class of organometallic aluminum compounds of formula (II) suitable as a component of the catalysts of the invention are those wherein the (CH$_2$—CR$^4$R$^5$R$^6$) group derives from the product of the oligomerization of lower α-olefins, such as propylene or 1-butene. In this case, w is preferably 1 or 2.

Oligomers of α-olefins suitable for synthesizing the aluminum compounds of the invention can be prepared, for instance, by carrying out the reaction of oligomerization in the presence of a metallocene catalyst as described, for instance, by L. Resconi et al. in "J. Am. Chem. Soc. 1992, 114, 1025–1032" or in European patent application EP-562,258.

The components of the catalysts of the present invention can be brought into contact in different ways.

It is possible, for instance, to first contact the aluminum compound with water and, subsequently, the thus obtained reaction product is brought into contact with the metallocene compound.

The components of the catalysts of the present invention can also be brought into contact by other methods such as, for instance, by first contacting the aluminium compound with the cyclopentadienyl compound and, thereafter, with water.

According to a particular embodiment of the invention, water can be gradually added to the aluminum compound in solution in an aliphatic or aromatic inert hydrocarbon solvent such as, for example, heptane or toluene. Thereafter, the thus obtained solution is contacted with a solution of the cyclopentadienyl compound in a suitable solvent such as, for example, toluene.

According to another embodiment, the water can be introduced in the monomer or in one of the monomers to be polymerized. In this case, the aluminum compound and the cyclopentadienyl compound are precontacted before being used in the polymerization.

According to still another embodiment, the water can be reacted in a combined form as a hydrated salt, or it can be adsorbed or absorbed on an inert support such as silica.

According to a further embodiment, the aluminum compound can be allowed to react with boric anhydride and with boric acid.

The catalysts of the present invention can be used on inert supports. This is achieved by depositing the cyclopentadienyl compound, or the product of the reaction thereof with the aluminum compound pre-reacted with water, or the alkylaluminum compound pre-reacted with water and subsequently the cyclopentadienyl compound, on inert supports such as, for example, silica, alumina, styrene/divinylbenzene copolymers, polyethylene or polypropylene.

The thus obtained solid compound, together with further addition of alkyl aluminum compound either as such or pre-reacted with water, can be suitably used in gas phase polymerizations.

A particularly suitable class of inert supports for the catalysts of the present invention are porous organic supports functionalized with functional groups having active hydrogen atoms. Particularly preferred are those in which the organic support is a partially crosslinked styrene polymer. These supports are described in European patent application EP-633,272, the contents of which are incorporated in the present description.

The catalysts of the present invention can be used in the polymerization reactions of olefins.

Olefins which can be polymerized with the process of the present invention are, for instance, the α-olefins of the formula CH$_2$=CHR wherein R is hydrogen or an alkyl radical having from 1 to 20 carbon atoms.

The catalysts according to the present invention can conveniently be used for the homopolymerization of ethylene, in particular for the preparation of HDPE, and for the copolymerization of ethylene, in particular for the preparation of LLDPE.

The LLDPE copolymers which can be prepared have a content of ethylene units of between 80 and 99 mol %. Their density is between 0.87 and 0.95 g/cm$^3$ and they are characterized by a uniform distribution of the α-olefin units along the polymeric chain.

Olefins which can be used as comonomers in the ethylene copolymers comprise the α-olefins of the formula CH$_2$=CHR wherein R is a linear, branched or cyclic alkyl radical having 1 to 20 carbon atoms, and the cycloolefins. Examples of such olefins are propylene, 1-butene, 1-pentene, 4-methyl-1-pentene, 1-hexene, 1-octene, allylcyclohexane, cyclopentene, cyclohexene, norbornene and 4,6-dimethyl-1-heptene. The units deriving from the olefins of the formula CH$_2$=CHR or from the cycloolefins are generally present in the copolymers in a quantity of from 1 to 20 mol %.

The copolymers can also contain units deriving from polyenes, in particular from conjugated or non-conjugated, linear or cyclic dienes such as, for example, 1,4-hexadiene, isoprene, 1,3-butadiene, 1,5-hexadiene and 1,6-heptadiene.

A further use of interest for the catalysts of the invention is the preparation of elastomeric copolymers of ethylene with α-olefins of the formula CH$_2$=CHR wherein R is an alkyl radical having 1 to 10 carbon atoms, optionally containing minor proportions of units deriving from polyenes.

The saturated elastomeric copolymers obtainable with the catalysts of the present invention contain from 15 to 85 mol % of ethylene units, the complement to 100% consisting of units of one or more α-olefins and/or of a non-conjugated diolefin able to cyclopolymerize. The unsaturated elastomeric copolymers also contain, in addition to the units deriving from the polymerization of ethylene and α-olefins, also minor proportions of unsaturated units deriving from the copolymerization of one or more polyenes. The content of unsaturated units can vary from 0.1 to 5% by moles and it is preferably comprised between 0.2 and 2% by moles.

The elastomeric copolymers obtainable with the catalysts of the invention are endowed with valuable properties, such as a low content of ashes and a uniformity of distribution of the comonomers along the copolymeric chain.

The α-olefins which can be used as comonomers in the elastomeric copolymers comprise, for example, propylene, 1-butene, 4-methyl-1-pentene, 1-hexene, 1-ottene.

Polyenes which can be used in the elastomeric copolymers comprises:

polyenes able to give unsaturated units, such as:
linear, non-conjugated dienes such as 1,4-hexadiene trans, 1,4-hexadiene cis, 6-methyl-1,5-heptadiene, 3,7-dimethyl-1,6-octadiene, 11-methyl-1,10-dodecadience;
monocyclic diolefins such as, for example, cis-1,5-cyclooctadiene and 5-methyl-1,5-cyclooctadiene;
bicyclic diolefins such as for example 4,5,8,9-tetrahydroindene and 6 and/or 7-methyl-4,5,8,9-tetrahydroindene;
alkenyl or alkyliden norbornenes such as for example, 5-ethyliden-2-norbornene, 5-isopropyliden-2-norbornene, exo-5-isopropenyl-2-norbornene, 5-vinyl-2-norbornene;
polycyclic diolefins such as, for example, dicyclopentadiene, tricyclo-[6.2.1.0$^{2.7}$]4,9-undecadiene and the 4-methyl derivative thereof;
non-conjugated diolefins able to cyclopolymerize, such as 1.5-hexadiene, 1,6-heptadiene, 2-methyl-1,5-hexadiene; cojugated dienes, such as butadiene, 1,3-pentadiene and isoprene.

A still further interesting use of the catalysts according to the present invention is for the preparation of cycloolefin polymers. Monocyclic and polycyclic olefin monomers can be either homopolymerized or copolymerized, also with linear olefin monomers. Non limitative examples of cycloolefin polymers which can be prepared with the catalyst of the present invention are described in the European patent applications EP-501,370 and EP-407,870, the contents of which are incorporated in the present description.

The polymerization processes of the present invention can be carried out in liquid phase, in the presence or not of an inert hydrocarbon solvent, or in gas phase. The hydrocarbon solvent can be either aromatic such as, for example, toluene, or aliphatic such as, for example, propane, hexane, heptane, isobutane, cyclohexane.

The polymerization temperature generally ranges from about 0° C. to about 250° C. In particular, in the processes for the preparation of HDPE and LLDPE it is generally comprised between 20° C. and 150° C. and, more particularly, between 40° C. and 90° C., whereas for the preparation of the elastomeric copolymers it is generally comprised between 0° C. and 200° C. and, particularly, between 20° C. and 100° C.

The molecular weight of the polymers can be varied simply by varying the polymerization temperature, the type or the concentration of the catalyst components or by using molecular weight regulators such as, for example, hydrogen.

The molecular weight distribution can be varied by using mixtures of different cyclopentadienyl compounds or by carrying out the polymerization in several stages which differ in the polymerization temperature and/or the concentrations of molecular weight regulator.

The polymerization yield depends on the purity of the metallocene components in the catalyst. Therefore the metallocene obtained by the process of the invention may be used as such, or subjected to purification treatments.

Particularly interesting results are obtained when the components of the catalyst are contacted among them before the polymerization. The contact time is generally comprised between 1 and 60 minutes, preferably between 5 and 20 minutes. The precontact concentrations for the cyclopentadienyl compound are comprised between $10^{-2}$ and $10^{-8}$ mol/l, while for the product of the reaction between the aluminum compound and water they are comprised between 10 and $10^{-3}$ mol/l. The precontact is generally carried out in the presence of a hydrocarbon solvent and, optionally, of small amounts of monomer.

The following examples are given for illustrative purposes and do not restrict the invention.

CHARACTERIZATIONS

The intrinsic viscosity [η] has been measured in tetrahydronaphtalene at 135° C.

The Melt Index (MI) was measured under the following conditions:

Condition E ($I_2$: ASTM D-1238) at 190° C. with a 2.16 kg load;

Condition F ($I_{21}$: ASTM D-1238) with a 21.6 kg load; the Melt Flow Ratio (MFR) is equal to the $I_{21}/I_2$ ratio.

The comonomer content in LLDPE copolymers and in the elastomeric ethylene/propylene copolymers was determined by IR analysis.

The Differential Scanning Calorimetry (DSC) measurements have been carried out on a DSC-7 apparatus of Perkin Elmer Co. Ltd., according to the following procedure. About 10 mg of sample are heated to 180° C. with a scanning speed equal to 10° C./minute; the sample is kept at 180° C. for 5 minutes and thereafter is cooled with a scanning speed equal to 10° C./minute. A second scanning is then carried out according to the same modalities as the first one. The values reported are those obtained in the first scanning in the case of the elastomeric copolymers, and those in the second scanning for the other polymers.

The solubility in xylene at 25° C. was determined according to the following procedure. About 2.5 g of polymer and 250 ml of xylene were placed in a round-bottomed flask provided with cooler and reflux condenser, and kept under nitrogen. This is heated to 131° C. and is kept stirred for about 60 minutes. This is allowed to cool under stirring to 25° C. The whole is filtered off and after evaporation of the solvent from the filtrate until a constant weight is reached, the weight of the soluble portion is calculated.

The absolute density (d) was determined by immersion of a sample of extruded copolymer in a density gradient column according to the method ASTM D-1505.

The components of the catalysts were prepared as follows:

CYCLOPENTADIENYL COMPOUNDS rac-ETHYLENE-BIS(INDENYL)ZIRCONIUM DICHLORIDE [r-EBIZrCl$_2$]

This was prepared by repeating the stages (a) and (b) of the synthesis of ethylene-bis(4,5,6,7-tetrahydroindenyl)-zirconium dichloride, described in European Patent Application EP 575,875.

rac-ETHYLENE-BIS(4.7-DIMETHYL-1-INDENYL)ZIRCONIUM DICHLORIDE [r-EBDMIZrCl$_2$]

This was prepared according to the procedure described in European Patent Application EP 575,875.

BIS(2-METHYL-INDENYL)ZIRCONIUM DICHLORIDE [(2Me—Ind)$_2$ZrCl$_2$]

(a) Synthesis of 2-methyl-2-indanol

A solution of 36 g of 2-indanone (distilled before use) in 400 ml of anhydrous Et$_2$O was added slowly to a mixture of methylmagnesium bromide (100 ml of a 3M solution in hexane) in 200 ml of Et$_2$O at 0° C.

The mixture was stirred at room temperature. After 3 hours, the reaction was terminated with 350 g of ice and a solution of 30 g of NH$_4$Cl in 500 ml of water. The organic phase was separated off, washed with 500 ml of a saturated solution of NaHCO$_3$ and then 500 ml of water, dried over sodium sulphate and concentrated in vacuo.

This gives 37.8 g of a light yellow solid which was identified by NMR and GC-MS analysis as 2-methyl-2-indanol.

(b) Synthesis of 2-methyl-indene 1 g of p-toluenesulphonic acid monohydrate and 25 g of the product obtained under (a) were dissolved in 100 ml of toluene. The solution obtained was kept under reflux for 2 hours. The GC analysis of the crude reaction product shows at this point that the conversion to 2-methyl-indene is 96%. The solution was concentrated in vacuo and then distilled in the presence of a small quantity of 4-t-butyl-catechol and 2 drops of NaOH.

This gave 16.7 g of 2-methyl-indene having a boiling point of 58°–60° C. at 2 mm Hg.

(c) Synthesis of bis(2-methyl-indenyl)zirconium dichloride 4.4 ml of a 2.5M solution of n-butyllithium in hexane were added to a solution of 1.42 g of 2-methyl-indene obtained under (b), dissolved in 30 ml of THF at 0° C. After the addition, the solution was allowed to return to room temperature and was stirred for a further 4 hours. The volatile substances were removed in vacuo, and the solid thus obtained washed with pentane.

1.27 g of ZrCl$_4$ in powder form were added to this solid and the whole was suspended in pentane. To facilitate the reaction, 1 ml of THF was added. The suspension was continuously stirred overnight and, at the end, the solids were separated off by filtration and washed with pentane.

The product thus obtained was dissolved in CH$_2$Cl$_2$ and filtered, and the solution was taken to dryness. In this way, 1.51 g of a yellow powder, identified by its NMR spectrum as bis(2-methyl-indenyl)zirconium dichloride, were obtained.

BIS(2-METHYL-4,5,6,7-TETRAHYDROINDENYL)ZIRCONIUM DICHLORIDE [(2MeH$_4$Ind)$_2$ZrCl$_2$]

0.768 g of (2Me—Ind)$_2$ZrCl$_2$ and 45 ml of CH$_2$O$_2$ were introduced into a 50 ml test tube. The mixture was stirred for 5 minutes at room temperature, and 25 mg of PtO$_2$ were added to the yellow suspension thus obtained; the resulting suspension was then transferred into a 100 ml autoclave. After displacing the nitrogen atmosphere with hydrogen and raising the pressure to 5 atmospheres, the system was left for 4 hours at room temperature with stirring. At the end of the reaction, the catalyst was removed by filtration. After concentrating the filtrate to complete removal of the solvent, this gives 0.603 g of a white solid identified by NMR analysis as (2MeH$_4$Ind)$_2$ZrCl$_2$.

rac-ETHYLENE-BIS(4,5,6,7-TETRAHYDROINDENYL)ZIRCONIUM DICHLORIDE (r-EBTHIZrCl$_2$)

This was prepared according to the procedure described in EP 575,875.

rac-DIMETHYLSILANDIYL-BIS(2-METHYL-1-INDENYL)ZIRCONIUM DICHLORIDE [r-Me$_2$Si(2Me—Ind)ZrCl$_2$]

The product commercially available from Boulder Co. was used after further purification by extraction with boiling CH$_2$Cl$_2$ and crystallization from CH$_2$Cl$_2$ at 0° C. The obtained product shows an isomer purity higher than 95%, as detected by $^1$H-N.M.R. analysis in CHCl$_3$ by comparing the area of the peaks at 2.25 ppm (rac) and 2.45 ppm (meso).

ORGANOMETALLIC ALUMINUM COMPOUNDS

TRIS(2,4,4-TRIMETHYL-PENTYL)ALUMINUM [TIOA]

This was prepared according to the method described in Liebigs Ann. Chem., Volume 629, Ziegler et al. "Aluminumtrialkyle und Dialkyl-aluminumhydride aus Aluminumisobutyl-Verbindungen [Aluminum trialkyls and dialkyl-aluminum hydrides from aluminum isobutyl compounds]", pages 14–19.

DI(2,4,4-TRIMETHYL-PENTYL)ALUMINUM HYDRIDE [DIOAH]

This was prepared according to the method described in Liebigs Ann. Chem., Volume 629, Ziegler et al. "Aluminumtrialkyle und Dialkyl-aluminumhydride aus Aluminumisobutyl-Verbindungen [Aluminum trialkyls and dialkyl-aluminum hydrides from aluminum isobutyl compounds]", pages 14–19.

TETRA-ISOBUTYLALUMOXANE [TIBAO]

The product commercially available from WITCO was used.

TRI-ISOBUTYLALUMINUM [TIBAL]

The product commercially available from WITCO was used.

DI-ISOBUTYLALUMINUM HYDRIDE [DIBAH]

The product commercially available from FLUKA was used.

TRI-n-OCTYLALUMINUM [TNOA]

The product commercially available from MERCK was used.

2-PHENYL-PROPYL-MODIFIED-DIBAH [M$^1$-DIBAH]

100 ml of toluene and 104.3 g of 2-phenyl-1-propene were charged in a glass reactor equipped with stirrer, kept under a nitrogen atmosphere. The obtained solution was stirred at 20° C., and 28.4 g of di-isobutyl-aluminum hydride were fed during 30 minutes. Gas evolution was observed. Then the temperature was brought to 117° C. and maintained constant for 15 hours, when gas evolution ceased. The obtained product was purified by distilling-off the light fractions. 49 g of a product were thus obtained as a residue at 153° C. and 0.003 mmHg. The amount of aluminum was measured as 10.3% by weight.

2-PHENYL-PROPYL-MODIFIED-DIBAH [M$^2$-DIBAH]

104.3 g of 2-phenyl-1-propene were charged in a glass reactor equipped with stirrer, kept under a nitrogen atmosphere. This was stirred at 20° C., and 15.7 g of di-isobutyl-aluminum hydride were feeded during 30 minutes. Gas evolution was observed. Then the temperature was brought to 120° C. and maintained constant for 15 hours, then to 140° C. for further 2 hours, when gas evolution ceased. The obtained product was purified by distilling-off the light fractions. 29.5 g of a product were thus obtained as a residue at 152° C. and 0.003 mmHg. The amount of aluminum was measured as 8.4% by weight.

1-BUTENE-OLIGOMERS-MODIFIED-DIBAH [$M^3$-DIBAH]

(a) Synthesis of 1-butene oligomers

Into a 2.5 l steel autoclave, provided with stirrer, manometer, temperature indicator, supplying system for the catalyst, feeding lines of monomers and thermostat, purified by washing with butene at 70° C., 1710 g of 1-butene were introduced at room temperature and then heated to 70° C. The catalyst was prepared by solving 10 mg of bis (cyclopentadienyl)-zirconium dichloride ($Cp_2ZrCl_2$) in 6.6 ml (1.98 g; Al/Zr=1000) of 30% toluene solution of methyl alumoxane (MAO - Witco). The solution was injected into the autoclave by a nitrogen over-pressure and the temperature kept constant for two hours. The reaction was stopped by injection of 0.6 l at standard pressure and temperature (STP) of CO, the autoclave was cooled to 30° C. and degassed from the residual monomer. The collected liquid (524 g) was analysed via gas-chromatography showing:

| | |
|---|---|
| C8 isomer | 18.8 mol % |
| C12 isomer | 16.9 mol % |
| C16 isomer | 12.9 mol % |
| C20 isomer | 11.4 mol % |
| C24 isomer | 9.0 mol % |
| C28 isomer | 7.5 mol % |
| C32 isomer | 6.1 mol % |
| C36 isomer | 5.4 mol % |
| C40 isomer | 4.1 mol % |
| C44 isomer | 3.2 mol % |
| C48 isomer | 2.7 mol % |
| C52 isomer | 2.0 mol % |

The average oligomerization degree ($n_{av}$) was calculated from the $^1$H-NMR spectra by the following formula:

$$n_{av}=(I_1+I_2)/4I_2$$

wherein $I_1$ is the area of the aliphatic region (0.5–2.3 ppm) and $I_2$ is the area of the olefinic region (4.6–4.8 ppm). It was obtained $n_{av}$=5.2.

(b) Synthesis of the aluminum compound 80 ml of the oligomer mixture prepared at point (a) were introduced in a glass reactor thermostated at 19° C. During a time of 15 minutes were additioned 6.0 ml (0.033 mole) of di-isobutyl-aluminum hydride (DIBAH). The temperature was slowly raised to 128° C. (in 1 hour) and kept constant for 30 minutes, than it was raised to 153° C. and kept constant for 12 hours. 78 ml of clear and viscous liquid were thus obtained. The elemental analysis shows Al=10.3 g/l.

1-BUTENE-OLIGOMERS-MODIFIED-DIBAH [$M^4$-DIBAH]

(a) Synthesis of 1-butene oligomers

The procedure described at point (a) of the preparation of $M^3$-DIBAH was followed, but after the two hours of reaction, a second solution of catalyst, equal to the previous, was injected and the reaction continued further 90 minutes. The collected liquid (700 g) was analysed via gas-chromatography showing:

| | |
|---|---|
| C8 isomer | 29.3 mol % |
| C12 isomer | 23.7 mol % |
| C16 isomer | 14.8 mol % |
| C20 isomer | 11.1 mol % |
| C24 isomer | 7.0 mol % |
| C28 isomer | 4.6 mol % |
| C32 isomer | 3.2 mol % |
| C36 isomer | 2.1 mol % |
| C40 isomer | 1.5 mol % |
| C44 isomer | 1.0 mol % |
| C48 isomer | 0.9 mol % |
| C52 isomer | 0.8 mol % |

The average oligomerization degree calculated from the $^1$H-NMR spectra was $n_{av}$=4.0.

The raw material was separated from unreacted 1-butene and distilled. A fraction of 132 g boiling at 118° C. (760 mmHg) was collected. The gas-chromatographic analysis of this fraction indicates the following composition:

| | |
|---|---|
| toluene | 12.6 mol % |
| 2-Etyl-1-hexene | 78.6 mol % (confirmed by $^1$H-NMR spectra) |
| other C8 isomers | 8.2 mol % |
| C12 isomers | 0.5 mol % |

The residue of the distillation (350 g), which was free from the dimer, was analyzed by $^1$H-NMR showing an average oligomerization degree $n_{av}$=5.2.

(b) Synthesis of the aluminum compound 80 ml of the residue of the distillation of the oligomer mixture, prepared at point (a), were introduced in a glass reactor thermostated at 25° C. During a time of 15 minutes were additioned 6.0 ml (0.033 mole) of di-isobutyl-aluminum hydride (DIBAH). The temperature was raised to 157° C. and kept constant for 7 hours. 82 ml of a clear liquid were thus obtained. The elemental analysis shows Al=10.2 g/l.

POLYMERIZATIONS

EXAMPLE 1

Preparation of HDPE

A 2.3 l steel autoclave equipped with a magnetic stirrer, manometer, temperature indicator, a catalyst-charging system, feed lines for the monomers and a thermostating jacket, was purged with ethylene at 70° C.

3 mmoles of $H_2O$ and then 1.087 l of hexane were introduced into the autoclave at room temperature. The temperature was raised to 80° C., then the autoclave was pressurized with 9.6 bar of ethylene, reaching a total pressure of 10 bar, and thereafter the autoclave was cooled to 75° C.

The catalyst suspension was prepared by dissolving the quantities of TIOA and of r-EBIZrCl$_2$ indicated in Table 1 in 5 ml of toluene. The solution was then introduced into the autoclave by means of excess ethylene pressure.

The temperature was raised again to 80° C. and the total pressure was kept constant by continuous feeding of ethylene. After 60 minutes the polymerization was interrupted by cooling to 30° C. and introducing 0.6 l(STP) of CO. The polymer suspension was filtered and the polymer obtained was dried in an oven at 60° C. in vacuo.

The polymerization conditions and the data relating to the obtained polymer are indicated in Table 1.

EXAMPLES 2–3
Preparation of HDPE

The procedure described in Example 1 was followed, but using DIOAH in place of TIOA and operating with the amounts of metallocene, aluminum compound and water indicated in Table 1.

The polymerization conditions and the data relating to the obtained polymers are indicated in Table 1.

EXAMPLE 4 (Comparison)
Preparation of HDPE

The procedure described in Example 1 was followed, but without introducing water into the autoclave, using TIBAO in place of TIOA and operating with the amounts of metallocene and aluminum compound indicated in Table 1. 50% of TIBAO was introduced into the autoclave, while the remaining 50% was used in the preparation of the catalyst suspension.

The polymerization conditions and the data relating to the obtained polymer are indicated in Table 1.

EXAMPLE 5 (Comparison)
Preparation of HDPE

The procedure described in Example 1 was followed, but using TIBAL in place of TIOA and operating with the amounts of metallocene, aluminum compound and water indicated in Table 1.

The polymerization conditions and the data relating to the obtained polymer are indicated in Table 1.

EXAMPLE 6 (Comparison)
Preparation of HDPE

The procedure described in Example 1 was followed, but using DIBAH in place of TIOA and operating with the amounts of metallocene, aluminum compound and water indicated in Table 1.

The polymerization conditions and the data relating to the obtained polymer are indicated in Table 1.

EXAMPLE 7 (Comparison)
Preparation of HDPE

The procedure described in Example 1 was followed, but using TNOA in place of TIOA and operating with the amounts of metallocene, aluminum compound and water indicated in Table 1.

The polymerization conditions and the data relating to the obtained polymer are indicated in Table 1.

EXAMPLE 8
Preparation of HDPE

The procedure described in Example 1 was followed, but using $M^1$-DIBAH in place of TIOA and operating with the amounts of metallocene, aluminum compound and water indicated in Table 1.

The polymerization conditions and the data relating to the obtained polymer are indicated in Table 1.

EXAMPLES 9–11
Preparation of HDPE

The procedure described in Example 1 was followed, but using $M^2$-DIBAH in place of TIOA and operating with the amounts of metallocene, aluminum compound and water indicated in Table 1.

The polymerization conditions and the data relating to the obtained polymers are indicated in Table 1.

EXAMPLE 12
Preparation of LLDPE

A 2.5 l steel autoclave equipped with a magnetic stirrer, manometer, temperature indicator, a catalyst-charging system, feed lines for the monomers and a thermostating jacket, was purged with propane at 70° C.

2.1 mmol of $H_2O$, 1260 ml of propane, 378 ml of 1-butene and the amounts of ethylene and hydrogen corresponding to 17.1 and 0.7 bar respectively were introduced into the autoclave at room temperature. Then the temperature was raised to 45° C.

The catalyst suspension was prepared by dissolving the quantities of TIOA and of r-EBDMIZrCl$_2$ indicated in Table 2 in 5 ml of toluene. The reagents were left in contact for 5 minutes, and the solution was then introduced into the autoclave by means of excess ethylene pressure.

The temperature was then raised to 50° C. and kept constant for the duration of the polymerization. The total pressure was kept constant by continuously feeding an ethylene/1-butene mixture in a molar ratio equal to 18. The polymerization was stopped by introducing 0.6 l(STP) of CO into the autoclave after rapid cooling to 30° C. The reactor was then allowed to degas slowly, and the polymer thus obtained was dried at 60° C. in vacuo.

The polymerization conditions and the data relating to the obtained polymer are indicated in Table 2.

EXAMPLE 13 (Comparison)
Preparation of LLDPE

The procedure described in Example 1 was followed, but using TIBAL in place of TIOA and operating with the amounts of metallocene, aluminum compound and water indicated in Table 1.

The polymerization conditions and the data relating to the obtained polymer are indicated in Table 2.

EXAMPLES 14–15
Preparation of elastomeric $C_2/C_3$-copolymers

Hexane, propylene and ethylene in quantities such as to give a liquid phase consisting of 15.5% by weight of hexane, 69.1% by weight of propylene and 15.39% by weight of ethylene were introduced at room temperature into a 1.36 liter autoclave equipped with a stirrer, manometer, temperature indicator, a catalyst-charging system, feed lines for the monomers and a thermostating jacket, which had been purged with ethylene at 80° C. The autoclave was then brought to a temperature 5° C. lower than the polymerization temperature.

The catalyst solution was prepared by adding the quantities of water and of the aluminum compound indicated in Table 3 to a suspension of $(2MeH_4Ind)_2ZrCl_2$ in a hydrocarbon solvent consisting of about 2 ml of solvent per mg of metallocene. The suspension was continuously stirred for 5 minutes at a temperature of 20° C. and then injected into the autoclave under ethylene pressure.

The temperature of the autoclave was then rapidly raised to the required value and kept constant for the entire duration of the polymerization. The thus obtained polymer was isolated by removing the unreacted monomers and was then dried in vacuo.

The polymerization conditions and the data relating to the obtained polymers are indicated in Table 3.

EXAMPLE 16 (Comparison)
Preparation of elastomeric $C_2/C_3$-copolymers

The procedure described in Examples 14–15 was followed, but without introducing water into the autoclave and using TIBAO as the aluminum compound.

The polymerization conditions and the data relating to the obtained polymer are indicated in Table 3.

EXAMPLES 17–18
Preparation of elastomeric $C_2/C_3$-copolymers

Hexane, propylene and ethylene in quantities such as to give a liquid phase containing 30% by weight of hexane, 62% by weight of propylene and 7.8% by weight of ethylene were introduced at room temperature into a 4.25 liter autoclave equipped with a stirrer, manometer, temperature indicator, a catalyst-charging system, feed lines for the monomers and a thermostating jacket, which had been purged with ethylene at 80° C. The autoclave was then brought to a temperature 5° C. lower than the polymerization temperature.

The catalyst solution was prepared by adding the quantities of water and of the aluminum compound indicated in Table 3 to a suspension of r-EBTHIZrCl$_2$ in a hydrocarbon solvent composed of about 2 ml of solvent per mg of metallocene. The mixture was continuously stirred at a temperature of 20° C. for 5 minutes, and the solution was then injected into the autoclave under the pressure of an ethylene/propylene mixture.

The temperature of the autoclave was then rapidly raised to 50° C. and kept constant for the entire duration of the polymerization. The thus obtained polymer was isolated by removal of the unreacted monomers and then dried in vacuo.

The polymerization conditions and the data relating to the obtained polymers are indicated in Table 3.

EXAMPLE 19 (Comparison)
Preparation of elastomeric $C_2/_3$-copolymers

The procedure described in Examples 17–19 was followed, but without introducing water into the autoclave and using TIBAO as the aluminum compound.

The polymerization conditions and the data relating to the obtained polymer are indicated in Table 3.

EXAMPLE 20 (Comparison)
Preparation of elastomeric $C_2/C_3$-copolymers

The procedure described in Examples 17–19 was followed, but using DIBAH as the aluminum compound.

The polymerization conditions and the data relating to the obtained polymer are indicated in Table 3.

EXAMPLES 21–22
Preparation of elastomeric $C_2/C_3$-copolymers

The procedure described in Examples 14–15 was followed, except that the liquid phase contained 15.5% by weight of hexane, 63.2% by weight of propylene and 21.3% by weight of ethylene and that (2MeInd)$_2$ZrCl$_2$ was used in place of (2MeH$_4$Ind)$_2$ZrCl$_2$.

The polymerization conditions and the data relating to the obtained polymers are indicated in Table 3.

EXAMPLE 23 (Comparison)
Preparation of elastomeric $C_2/C_3$-copolymers

The procedure described in Examples 21–22 was followed, but without introducing water into the autoclave and using TIBAO as the aluminum compound. No formation of polymer was observed.

The polymerization conditions are indicated in Table 3.

EXAMPLE 24
Polymerization of propylene

A 1 liter autoclave equipped with thermostating jacket, helical stirrer and a resistance heater connected to a thermostat for controlling the polymerization temperature, purged with a solution of TIBAL in hexane and dried while hot in a nitrogen stream, was charged in this order with 34.6 microliters of distilled H$_2$O and 400 ml of propylene, while taking the internal temperature to 68° C.

Separately, 3.2 mg of rac-EBIZrCl$_2$ were dissolved in 3.2 ml of toluene, and the solution obtained was added to 3.84 ml of a 1-molar solution of TIOA in hexane. After 10 minutes at room temperature, the solution was charged into the autoclave by means of excess nitrogen pressure, the temperature was raised to 70° C. and kept constant for the entire duration of the polymerization (1 hour), which was carried out with constant stirring at 400 rpm. At the end of the polymerization, the catalyst was deactivated by injecting 5 ml of methanol and the unreacted monomer was degassed. The thus obtained isotactic polypropylene shows a Tm (peak maximum during the second melting) of 134.7° C.

The polymerization conditions and the data relating to the obtained polymer are indicated in Table 4.

EXAMPLE 25
Polymerization of propylene

The procedure described in Example 24 was followed, but using M$^1$-DIBAH instead of TIOA and operating with the amounts of metallocene, aluminum compound and water indicated in Table 4.

The polymerization conditions and the data relating to the obtained polymer are indicated in Table 4.

EXAMPLES 26–28
Polymerization of propylene

The procedure described in Example 24 was followed, but using M$^3$-DIBAH instead of TIOA and operating with the amounts of metallocene, aluminum compound and water indicated in Table 4.

The polymerization conditions and the data relating to the obtained polymers are indicated in Table 4.

EXAMPLE 29
Polymerization of propylene

The procedure described in Example 24 was followed, but using M$^4$-DIBAH instead of TIOA and operating with the amounts of metallocene, aluminum compound and water indicated in Table 4.

The polymerization conditions and the data relating to the obtained polymers are indicated in Table 4.

EXAMPLE 30 (Comparison)
Polymerization of propylene

The procedure described in Example 24 was followed, but without introducing water into the autoclave, using TIBAO instead of TIOA and operating with the amounts of metallocene and aluminum compound indicated in Table 4.

The polymerization conditions and the data relating to the obtained polymer are indicated in Table 4.

EXAMPLES 31–32
Polymerization of propylene

The procedure described in Example 24 was followed, but using M$^1$-DIBAH or M$^2$-DIBAH (as indicated in Table 4) instead of TIOA, r-Me$_2$Si(2Me—Ind)ZrCl$_2$ instead of r-EBIZrCl$_2$ and operating with the amounts of metallocene, aluminum compound and water indicated in Table 4.

The polymerization conditions and the data relating to the obtained polymer are indicated in Table 4.

EXAMPLE 33 (Comparison)
Polymerization of propylene

The procedure described in Examples 31–32 was followed, but without introducing water into the autoclave and using 8.4 mmoles of TIBAO as the aluminum compound.

The polymerization conditions and the data relating to the obtained polymer are indicated in Table 4.

TABLE 1

| Example | Metallocene Type | mol 10⁻⁶ | Cocatalyst Type | Al\H₂O mmol | Al\Zr mol | Yield g | Activity Kg\gZr·h | [η] dl\g | Melt Index E g\10' | F g\10' | F\E |
|---|---|---|---|---|---|---|---|---|---|---|---|
| 1 | r-EBIZrCl₂ | 1.2 | TIOA | 6 | 2 | 5000 | 64 | 587 | 1.56 | 1.34 | 36.6 | 27.3 |
| 2 | " | 1.2 | DIOAH | 6 | 2 | 5000 | 58 | 532 | 1.57 | 1.62 | 37.3 | 23 |
| 3 | " | 2.4 | DIOAH | 12 | 2 | 5000 | 124* | 1138 | 1.59 | 0.89 | 31.4 | 35.3 |
| 4 (Comp) | " | 2.4 | TIBAO | 12 | — | 5000 | 27 | 123 | 2.08 | 0.39 | 10.9 | 27.8 |
| 5 (Comp) | " | 2.4 | TIBAL | 12 | 2 | 5000 | 48 | 220 | 1.80 | 0.45 | 13.8 | 30.7 |
| 6 (Comp) | " | 1.2 | DIBAH | 6 | 2 | 5000 | 11 | 101 | 1.34 | 2.7 | 66.9 | 24.8 |
| 7 (Comp) | " | 2.4 | TNOA | 12 | 2 | 5000 | 10 | 46 | 1.04 | 2.28 | 85.2 | 37.4 |
| 8 | " | 2.4 | M¹-DIBAH | 7.2 | 2 | 3000 | 84 | 385 | 1.54 | 2.55 | 64.4 | 25.2 |
| 9 | " | 2.4 | M²-DIBAH | 7.2 | 2 | 3000 | 73 | 670 | 1.62 | 0.71 | 26.6 | 37.5 |
| 10 | " | 1.2 | M²-DIBAH | 3.6 | 2 | 3000 | 41 | 376 | 1.70 | 0.53 | 20.3 | 38.3 |
| 11 | " | 1.2 | M²-DIBAH | 6.0 | 2 | 5000 | 35 | 321 | 1.59 | 3.88 | 84.1 | 21.7 |

*30 minutes

TABLE 2

| Example | Metallocene Type | mg | Cocatalyst Type | Al\H₂O mmol | Al\Zr mol | Yield g. Pol. | Activity Kg\gZr·h | [η] dl\g | MIE g\10' | C4 F\E | d % wt | XS g\cm³ | DSC Tm % wt | ΔH ° C. | J\g |
|---|---|---|---|---|---|---|---|---|---|---|---|---|---|---|---|
| 12 | r-EBDMIZrCl₂ | 0.5 | TIOA | 4.2 | 2 | 4000 | 282 | 1.956 | 1.29 | 1.3 | 39.5 | 10.5 | 0.9156 | 0.5 | 108 | 86 |
| 13 (Comp) | " | 1 | TIBAL | 4.2 | 2 | 2000 | 68 | 177 | 1.26 | 1.3 | 22 | 8 | 0.9206 | 0.9 | 114 | 124 |

TABLE 3

| Example | Metallocene Type | mg | Cocatalyst Type | Al\H₂O mmol | Al\Zr mol | T (° C.) | t min | Yield g Pol. | Activity Kg\gZr | [η] dl\g | C₂ % wt |
|---|---|---|---|---|---|---|---|---|---|---|---|
| 14 | (2MeH₄Ind)₂ZrCl₂ | 1 | TIOA | 4.67 | 2 | 2000 | 22 | 120 | 162 | 760 | 7.96 | 45.1 |
| 15 | " | 1 | DIOAH | 4.67 | 2 | 2000 | 25 | 120 | 230 | 1080 | 7.14 | 52.2 |
| 16 (Comp) | " | 1 | TIBAO | 4.67 | — | 2000 | 20 | 120 | 53 | 250 | 11.9 | 56.2 |
| 17 | r-EBTHIZrCl₂ | 0.8 | TIOA | 3.75 | 2 | 2000 | 50 | 50 | 262 | 1530 | 4.94 | 57 |
| 18 | " | 0.8 | DIOAH | 3.75 | 2 | 2000 | 50 | 54 | 418 | 2445 | 3.94 | 52.5 |
| 19 (Comp) | " | 0.8 | TIBAO | 3.75 | — | 2000 | 50 | 53 | 149 | 870 | 4.7 | 59.2 |
| 20 (Comp) | " | 0.8 | DIBAH | 3.75 | 2 | 2000 | 50 | 120 | 114 | 665 | 3.76 | 57.9 |
| 21 | (2MeInd)₂ZrCl₂ | 1 | TIOA | 4.7 | 2 | 2000 | 25 | 120 | 84 | 390 | 4.94 | 63.2 |
| 22 | " | 1 | DIOAH | 4.7 | 2 | 2000 | 25 | 120 | 130 | 600 | n.d. | n.d. |
| 23 (Comp) | " | 1 | TIBAO | 4.7 | — | 2000 | 25 | 120 | 0 | — | — | — | n.d. = not determined

TABLE 4

| Example | Metallocene Type | mg | Cocatalyst Type | Al\H₂O mmol | Al\Zr mol | T (° C.) | Yield g Pol. | Activity Kg\gZr·h | [η] dl\g |
|---|---|---|---|---|---|---|---|---|---|
| 24 | r-EBIZrCl₂ | 3.2 | TIOA | 3.84 | 2 | 500 | 70 | 70 | 100 | 0.31 |
| 25 | " | 0.53 | M¹-DIBAH | 3.8 | 2 | 3000 | 50 | 6.2 | 53.7 | 0.44 |
| 26 | " | 0.50 | M³-DIBAH | 3.8 | 2 | 3000 | 50 | 14.2 | 122.9 | 0.37 |
| 27 | " | 3.2 | M³-DIBAH | 3.8 | 2 | 500 | 50 | 69.7 | 99.9 | 0.36 |
| 28 | " | 3.2 | M³-DIBAH | 3.8 | 2 | 500 | 70 | 57.1 | 81.9 | 0.33 |
| 29 | " | 0.50 | M⁴-DIBAH | 3.8 | 2 | 3000 | 50 | 7.0 | 60.6 | 0.54 |
| 30 (Comp) | " | 0.53 | TIBAO | 3.8 | — | 3000 | 50 | 0.8 | 6.9 | n.d. |
| 31 | r-Me₂Si(2Me-Ind)ZrCl₂ | 1.0 | M¹-DIBAH | 8.4 | 2 | 4000 | 60 | 156 | 814 | 2.04 |
| 32 | " | 1.0 | M²-DIBAH | 8.4 | 2 | 4000 | 60 | 75 | 391 | 1.65 |
| 33 (Comp) | " | 1.0 | TIBAO | 8.4 | — | 4000 | 60 | 0 | — | — | n.d. = not determined

From the data shown in Tables 1 to 4 it clearly appears, and this represents an absolutely surprising feature of the present invention, that the particular aluminum compounds according to the invention can unexpectedly activate catalysts in which the component (A) consists of particular metallocene compounds which, when used in combination with aluminum compounds differing from those according to the invention, such as TIBAO, show almost no activity at all. This is particularly true in preparation of ethylene elastomeric copolymers or of polypropylene.

What is claimed is:

1. A catalyst for the polymerization of olefins comprising the product obtained by contacting the following components:

(A) a cyclopentadienyl compound of the formula (I):

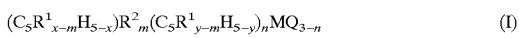

in which M is Ti, Zr or Hf, $C_5R^1_{x-m}H_{5-x}$ and $C_5R^1_{y-m}H_{5-y}$ are cyclopentadienyl rings substituted in the same way or different ways, the substituents $R^1$ which can be identical or different are alkyl, alkenyl, aryl, alkylaryl or arylalkyl radicals which have 1 to 20 carbon atoms and can also contain atoms of Si or Ge, or groups $Si(CH_3)_3$, or two or four substituents $R^1$ of one and the same cyclopentadienyl group can also form one or two rings having 4 to 6 carbon atoms, $R^2$ is a group which as a bridge links the two cyclopentadienyl rings and is selected from the group consisting of $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, with the substituents $R^3$ which can be identical or different being $R^1$ or hydrogen or two or four substituents $R^3$ can also form one or two rings having 3 to 6 carbon atoms, the substituents Q which can be identical or different are halogen, hydrogen, $R^1$, $OR^1$, $SR^1$, $NR^1_2$ or $PR^1_2$, m can be 0 or 1, n can be 0 or 1, being 1, if m=1, x is an integer of between (m+1) and 5, and y is an integer of between m and 5, (B) an organometallic aluminum compound of the formula (II):

wherein in the ($CH_2$—$CR^4R^5R^6$) groups, which are the same or different, $R^4$ is an alkyl, alkenyl or arylalkyl group having from 1 to 10 carbon atoms, $R^5$ is an alkyl, alkenyl, aryl, arylalkyl or alkylaryl group having from 3 to 50 carbon atoms which is different from a straight alkyl or alkenyl group and, optionally, $R^4$ and $R^5$ fused together can form a ring having from 4 to 6 carbon atoms, $R^6$ is hydrogen or an alkyl, alkenyl or arylalkyl group having from 1 to 10 carbon atoms, the $R^7$ substituents, same or different, are alkyl, alkenyl, aryl, arylalkyl or alkylaryl radicals containing from 1 to 10 carbon atoms and, optionally, can contain Si or Ge atoms, w is 1, 2 or 3, z is 0 or 1, y=3−w−z; and (C) water;

the molar ratio between the organometallic aluminum compound and the water being comprised between 1:1 and 100:1.

2. The catalyst according to claim 1, wherein the molar ratio between the organometallic aluminum compound and the water is 2.

3. The catalyst according to claim 1 or 2, wherein the molar ratio between the aluminum of the organometallic aluminum compound and the metal M of the cyclopentadienyl compound comprises between 50 and 10,000.

4. The catalyst according to claim 1 wherein, in the cyclopentadienyl compound of the formula (I), the metal M is zirconium.

5. The catalyst according to claim 1 wherein, in the cyclopentadienyl compound of the formula (I), m=0, the $C_5R^1_{x-m}H_{5-x}$ and $C_5R^1_{y-m}H_{5-y}$ groups are selected from the group consisting of pentamethyl-cyclopentadienyl, indenyl and 4,5,6,7-tetrahydroindenyl groups, and the Q substituents are chlorine atoms or methyl groups.

6. The catalyst according to claim 1 wherein, in the cyclopentadienyl compound of the formula (I), m=1, the $C_5R^1_{x-m}H_{5-x}$ and $C_5R^1_{y-m}H_{5-y}$ groups are selected from the group consisting of tetramethyl-cyclopentadienyl, indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl-4,5,6,7-tetrahydroindenyl and fluorenyl groups, $R^2$ is a $(CH_3)_2Si$ or $C_2H_4$ group, and the Q substituents are chlorine atoms or methyl groups.

7. The catalyst according to any of claims 1 to 6 wherein, in the organometallic aluminum compound of the formula (II), $R^4$ is a methyl or ethyl group, $R^5$ is selected from the group branched-chain alkyl, alkenyl and alkylaryl group having from 3 to 30 carbon atoms, $R^6$ is hydrogen, and $R^7$ is an alkyl group containing from 1 to 5 carbon atoms.

8. The catalyst according to claim 1, wherein the organometallic aluminum compound of the formula (II) is selected from:

tris(2,4,4-trimethylpentyl)aluminum,
   bis(2,4,4-trimethylpentyl)aluminum hydride,
   isobutyl-bis(2-phenyl-propyl)aluminum,
   diisobutyl-(2-phenyl-propyl)aluminum,
   isobutyl-bis(2,4,4-trimethylpentyl)aluminum, and
   diisobutyl-(2,4,4-trimethylpentyl)aluminum.

9. The catalyst according to claim 1 wherein, in the organometallic aluminum compound of the formula (II), the ($CH_2$—$CR^4R^5R^6$) group is obtained from the product of the oligomerization of lower α-olefins, such as propylene or 1-butene.

10. The catalyst according to claim 9 wherein, in the organometallic aluminum compound of the formula (II), w is 1 or 2.

11. A catalyst for the polymerization of olefins comprising the product obtained by contacting the following components:

(A) a cyclopentadienyl compound of the formula (I):

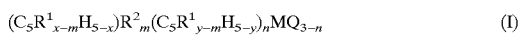

in which M is Ti, Zr or Hf, $C_5R^1_{x-m}H_{5-x}$ and $C_5R^1_{y-m}H_{5-y}$ are cyclopentadienyl rings substituted in the same way or different ways, the substituents $R^1$ which can be identical or different are alkyl, alkenyl, aryl, alkylaryl or arylalkyl radicals which have 1 to 20 carbon atoms and can also contain atoms of Si or Ge, or groups $Si(CH_3)_3$, or two or four substituents $R^1$ of one and the same cyclopentadienyl group can also form one or two rings having 4 to 6 carbon atoms, $R^2$ is a group which as a bridge links the two cyclopentadienyl rings and is selected from the group consisting of $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, with the substituents $R^3$ which can be identical or different being $R^1$ or hydrogen or two or four substituents $R^3$ can also form one or two rings having 3 to 6 carbon atoms, the substituents Q which can be identical or different are halogen, hydrogen, $R^1$, $OR^1$, $SR^1$, $NR^1_2$ or $PR^1_2$, m can be 0 or 1, n can be 0 or 1, being 1, if m=1, x is an integer of between (m+1) and 5, and y is an integer of between m and 5; and (B') the product of the reaction between water and an organometallic aluminum compound of the formula (II):

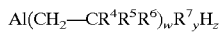
(II)

wherein in the ($CH_2$—$CR^4R^5R^6$) groups, which are the same or different, $R^4$ is an alkyl, alkenyl or arylalkyl group having from 1 to 10 carbon atoms, $R^5$ is an alkyl, alkenyl, aryl, arylalkyl or alkylaryl group having from 3 to 50 carbon atoms which is different from a straight alkyl or alkenyl group and, optionally, $R^4$ and $R^5$ fused together can form a ring having from 4 to 6 carbon atoms, $R^6$ is hydrogen or an alkyl, alkenyl or arylalkyl group having from 1 to 10 carbon atoms, the $R^7$ substituents, same or different, are alkyl, alkenyl, aryl, arylalkyl or alkylaryl radicals containing from 1 to 10 carbon atoms and, optionally, can contain Si or Ge atoms, w is 1, 2 or 3, z is 0 or 1, y=3−w−z, the molar ratio between the organometallic aluminum compound and the water being comprised between 1:1 and 100:1.

12. The catalyst according to claim 7 wherein $R^5$ is from 4 to 10 carbon atoms.

13. The catalyst according to claim 7 wherein $R^5$ is a substituted phenyl group.

14. The catalyst of claim 1 in which $R^5$ has between 3 and 30 carbon atoms.

15. The catalyst of claim 1 in which $R^5$ has between 4 and 10 carbon atoms.

16. The catalyst of claim 11 in which $R^5$ has between 3 and 30 carbon atoms.

17. The catalyst of claim 11 in which $R^5$ has between 4 and 10 carbon atoms.

18. The catalyst of claim 11 in which the ($CH_2$—$CR^4R^5R^6$) group comprises at least one oligomer having a plurality of repeat units, said repeat units having the structure of a residue of a monomer selected from the group consisting of propylene and 1-butene.

19. The catalyst according to claim 9 wherein the lower α-olefin is propylene or 1-butene.

* * * * *

UNITED STATES PATENT AND TRADEMARK OFFICE
CERTIFICATE OF CORRECTION

PATENT NO. : 5,849,653
DATED : December 15, 1998
INVENTOR(S) : Tiziano DALL'OCCO, et al.

It is certified that error appears in the above-identified patent and that said Letters Patent is hereby corrected as shown below:

On the title page, section [75], the inventor Dall'Occo's residence is incorrect. Therefore, change "Farrara" to --Ferrara--.

On the title page, section [73], the Assignee's address in incorrect. Therefore, change "Hoffddorp" to --Hoofddorp--.

In claim 7, line 4, after "group", insert --consisting of--.

Signed and Sealed this

Thirty-first Day of August, 1999

Attest:

Q. TODD DICKINSON

*Attesting Officer*     *Acting Commissioner of Patents and Trademarks*